US010060551B2

(12) United States Patent
Fujii et al.

(10) Patent No.: US 10,060,551 B2
(45) Date of Patent: Aug. 28, 2018

(54) STROKE DETECTION DEVICE

(71) Applicant: Komatsu Ltd., Tokyo (JP)

(72) Inventors: Daigoh Fujii, Oyama (JP); Shuuji Hori, Oyama (JP); Masato Kageyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/322,214

(22) PCT Filed: Jun. 30, 2014

(86) PCT No.: PCT/JP2014/067434
§ 371 (c)(1),
(2) Date: Dec. 27, 2016

(87) PCT Pub. No.: WO2016/001990
PCT Pub. Date: Jan. 7, 2016

(65) Prior Publication Data
US 2017/0152965 A1    Jun. 1, 2017

(51) Int. Cl.
| F16K 37/00 | (2006.01) |
| G01B 7/00 | (2006.01) |
| G01B 7/04 | (2006.01) |
| F16K 11/07 | (2006.01) |
| F15B 13/04 | (2006.01) |

(52) U.S. Cl.
CPC .......... *F16K 37/0041* (2013.01); *G01B 7/003* (2013.01); *G01B 7/046* (2013.01); *F15B 2013/0409* (2013.01); *F16K 11/07* (2013.01)

(58) Field of Classification Search
CPC ...... F16K 37/0041; F16K 11/07; G01B 7/003
USPC ......................................... 324/207.24, 200.2
See application file for complete search history.

(56) References Cited

U.S. PATENT DOCUMENTS

| 5,570,015 A * | 10/1996 | Takaishi ................ G01B 7/02 |
| | | 137/554 |
| 2011/0048348 A1* | 3/2011 | Hase ..................... F01L 1/022 |
| | | 123/90.15 |
| 2012/0199771 A1* | 8/2012 | Kasagi ............... F16K 31/0613 |
| | | 251/129.15 |

FOREIGN PATENT DOCUMENTS

| JP | 64-010888 A | 1/1989 |
| JP | 2004-012393 A | 1/2004 |
| JP | 2010-117139 A | 5/2010 |

OTHER PUBLICATIONS

International Search Report dated Sep. 2, 2014, issued for PCT/JP2014/067434.

* cited by examiner

*Primary Examiner* — Farhana Hoque
(74) *Attorney, Agent, or Firm* — Locke Lord LLP

(57) ABSTRACT

A stroke detection device for detecting, along a longitudinal direction, a stroke amount of a spool arranged in a valve main body. The stroke detection device includes: a device main body attached to the valve main body; a detection rod extending along the longitudinal direction of the spool, and movably arranged along the longitudinal direction inside the device main body, in a position where a tip end portion faces an end surface of the spool; a stroke detection unit configured to output a detection signal according to the stroke amount of the detection rod with respect to the device main body; and an attracting unit arranged in the tip end portion of the detection rod, the attracting unit being attracted to the end surface of the spool by magnetic force.

10 Claims, 4 Drawing Sheets

STROKE DETECTION DEVICE

FIELD

The present invention relates to a device for detecting a stroke amount of a spool along a longitudinal direction, the spool being arranged in a valve main body.

BACKGROUND

In construction machines handling information-oriented construction, the position of a working machine needs to be accurately controlled, and thus supply of oil to a hydraulic actuator such as a hydraulic cylinder also needs to be accurately controlled. Therefore, a valve unit mounted in this type of construction machines is provided with a stroke detection device for detecting a stroke amount of a spool in a longitudinal direction. The stroke detection device includes a detection rod movably arranged with respect to a device main body, and a stroke detection unit that outputs a detection signal according to the stroke amount of the detection rod with respect to the device main body, for example, and is attached to the valve main body through the device main body in a state where a tip end surface of the detection rod is in contact with an end surface of the spool. A coil spring that biases the detection rod toward the end surface of the spool is provided between the device main body and the detection rod (for example, see Patent Literature 1).

CITATION LIST

Patent Literature

Patent Literature 1: Japanese Laid-open Patent Publication No. 2004-12393 (FIG. 3)

SUMMARY

Technical Problem

To accurately detect the stroke amount of the spool, the state in which the detection rod is in contact with the end surface of the spool needs to be maintained on a steady basis. That is, in the stroke detection device described in Patent Literature 1, if a coil spring with a large set load is set, the detection rod is not separated from the end surface of the spool even if vibration or impact is applied. Therefore, the stroke amount of the spool can be accurately detected. However, in a case where a coil spring with a large set load is applied, the line diameter of the coil spring becomes large, and thus the stroke detection device is increased in size.

An objective of the present invention is to provide, in view of the foregoing, a stroke detection device that can accurately detect a stroke amount of a spool without increasing in size.

Solution to Problem

To solve the problem and achieve the object, a stroke detection device according to the present invention detects a stroke amount of a spool along a longitudinal direction. The spool being arranged in a valve main body. The stroke detection device includes: a device main body attached to the valve main body; a detection rod extending along the longitudinal direction of the spool, and movably arranged along the longitudinal direction inside the device main body, in a position where a tip end portion faces an end surface of the spool; and a stroke detection unit configured to output a detection signal according to the stroke amount of the detection rod with respect to the device main body; wherein an attracting unit attracted to the end surface of the spool by magnetic force is arranged in the tip end portion of the detection rod.

Moreover, in the stroke detection device according to the present invention, the attracting unit includes an aligning member being in contact with the end surface of the spool through a spherical surface, and a permanent magnet forming a cylindrical shape and arranged in a portion serving as a periphery of the aligning member.

Moreover, in the stroke detection device according to the present invention, the aligning member forms a columnar shape having the spherical surface on a tip end portion.

Moreover, in the stroke detection device according to the present invention, the aligning member is molded with nonmagnetic material.

Moreover, in the stroke detection device according to the present invention, a backup spring that biases the detection rod toward the spool is interposed between the device main body and the detection rod.

Advantageous Effects of Invention

According to the present invention, the detection rod is attracted to the spool by magnetic force, and thus large attracting force can be obtained without affecting an external dimension. Therefore, the stroke amount of the spool can be accurately detected without increasing in size.

DESCRIPTION OF EMBODIMENTS

Hereinafter, favorable embodiments of a stroke detection device according to the present invention will be described in detail with reference to the appended drawings.

Figure 2:
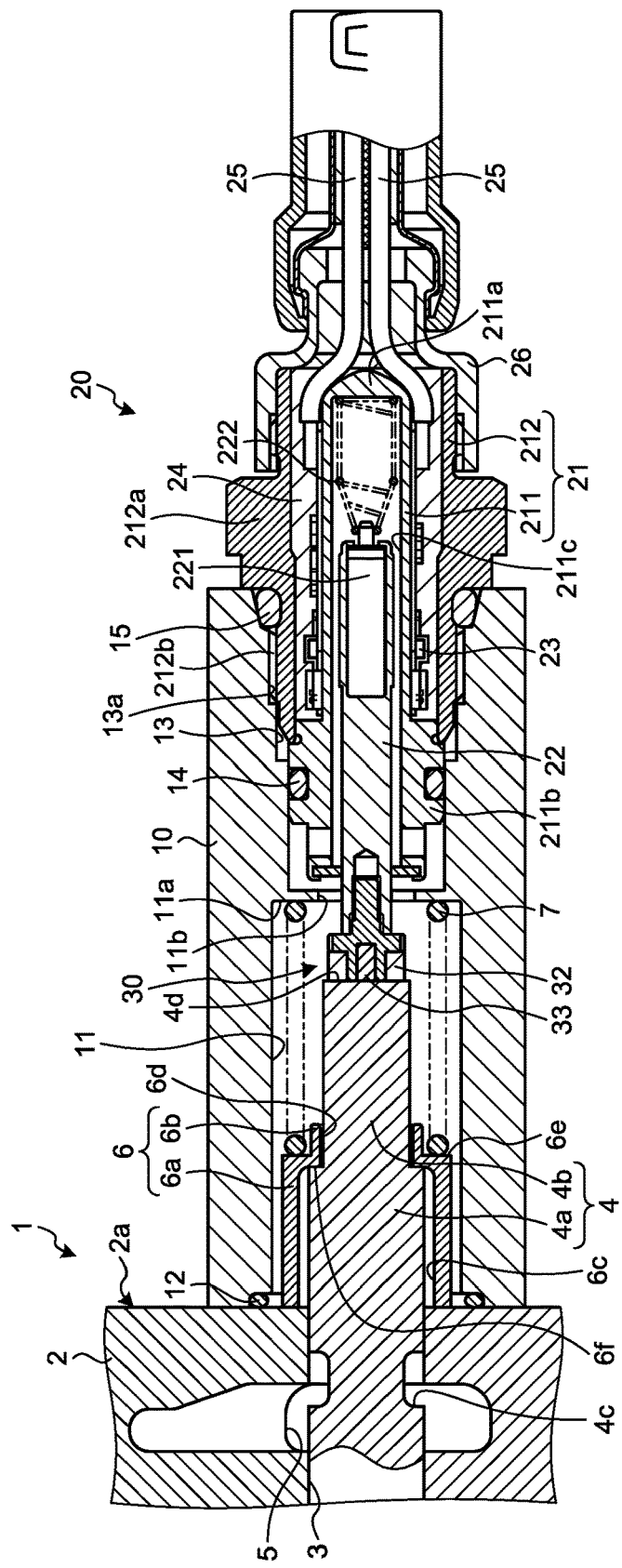
FIG. 2 is a sectional view illustrating principal portions of a valve unit to which the stroke detection device illustrated in FIG. 1 is applied.

FIG. 2 illustrates principal portions of a valve unit to which a stroke detection device that is an embodiment of the present invention is applied. A valve unit 1 exemplarily illustrated here is mounted in a working machine provided with a hydraulic actuator, for example, and is used to control supply of oil to the hydraulic actuator. The valve unit 1 includes a spool 4 in a spool hole 3 formed in a valve main body 2. The spool hole 3 is a columnar void space having a uniform inner diameter, and is open to an end surface 2a of the valve main body 2. A plurality of oil passages, which communicates into hydraulic equipment such as a hydraulic pump, a hydraulic cylinder, and an oil tank, communicates into the spool hole 3. Note that the reference sign 5 of FIG. 2 represents one of the plurality of oil passages.

The spool 4 is a columnar member made of steel arranged in the spool hole 3, and includes a spool base portion 4a and a spool small-diameter portion 4b. The spool base portion 4a is a columnar portion having an outer diameter that can be slidably accommodated into the spool hole 3. A recess portion 4c is formed in an outer peripheral surface of the spool base portion 4a. The recess portion 4c is an annular recess portion provided in an outer periphery of the spool base portion 4a, and functions to switch a state to connect the adjacent oil passages and a state to disconnect the adjacent oil passages, when the spool 4 is moved along the longitudinal direction with respect to the valve main body 2. The spool small-diameter portion 4b is a columnar portion having a small diameter provided in an end portion of the spool base portion 4a.

As is clear from FIG. 2, one end portion of the spool 4 protrudes from the end surface 2a of the valve main body 2, and is accommodated inside a sensor holder 10 provided in the valve main body 2. The sensor holder 10 forms a cylindrical shape including a spool accommodating hole 11 having a larger inner diameter than the spool hole 3, and is attached to the valve main body 2 through one end surface in a state of surrounding an open end of the spool hole 3. An oil seal 12 intervenes between the one end surface of the sensor holder 10 and the valve main body 2. The spool accommodating hole 11 of the sensor holder 10 is provided from the one end surface of the sensor holder 10 along a central axis, and includes an inner bottom surface 11a in a position that is nearly ½ the entire length of the sensor holder 10 along the longitudinal direction. A return spring 7 is interposed between the inner bottom surface 11a of the spool accommodating hole 11 and the spool 4 through an adaptor 6.

The adaptor 6 is formed such that a large-diameter portion 6a and a small-diameter portion 6b having different diameters from each other are integrally molded. The large-diameter portion 6a of the adaptor 6 forms a cylindrical shape including a first through hole 6c having an inner diameter larger than the outer diameter of the spool base portion 4a. The small-diameter portion 6b of the adaptor 6 forms a cylindrical shape including a second through hole 6d having an inner diameter larger than the outer diameter of the spool small-diameter portion 4b and smaller than the outer diameter of the spool base portion 4a. An outer peripheral step portion 6e is provided in an outer peripheral portion between the large-diameter portion 6a and the small-diameter portion 6b, and an inner peripheral step portion 6f is provided in an inner peripheral portion between the large-diameter portion 6a and the small-diameter portion 6b. The adaptor 6 is arranged in the spool accommodating hole 11 of the sensor holder 10 in a state where the large-diameter portion 6a is arranged in the outer periphery of the spool base portion 4a, and the small-diameter portion 6b is arranged in an outer periphery of the spool small-diameter portion 4b.

The return spring 7 has one end portion in contact with the outer peripheral step portion 6e of the adaptor 6 and the other end portion in contact with the inner bottom surface 11a of the spool accommodating hole 11, and functions to press the adaptor 6 in a direction of coming close to the end surface 2a of the valve main body 2 in a steady basis. When the spool 4 is in the state illustrated in FIG. 2, an end surface of the large-diameter portion 6a is in contact with the end surface 2a of the valve main body 2, and no pressing force of the return spring 7 acts on the spool 4. In contrast, when the spool 4 strokes rightward from the state illustrated in FIG. 2, an end surface of the spool base portion 4a comes in contact with the inner peripheral step portion 6f, and thus the adaptor 6 is moved rightward together with the spool 4, and the return spring 7 is compressed. That is, when the spool 4 strokes rightward with respect to the valve main body 2, the return spring 7 acts to press the spool 4 leftward in FIG. 2 through the inner peripheral step portion 6f of the adaptor 6.

Although not illustrated, the valve unit 1 is provided with a valve actuator in the other end portion of the spool 4. The valve actuator causes the spool 4 to stroke rightward in FIG. 2 with respect to the valve main body 2 along the longitudinal direction. When the spool 4 strokes rightward by the valve actuator, the return spring 7 is compressed as described above. Therefore, in a case where driving of the valve actuator is stopped, the spool 4 strokes leftward by return force of the return spring 7, and is returned to the state illustrated in FIG. 2.

Figure 1:
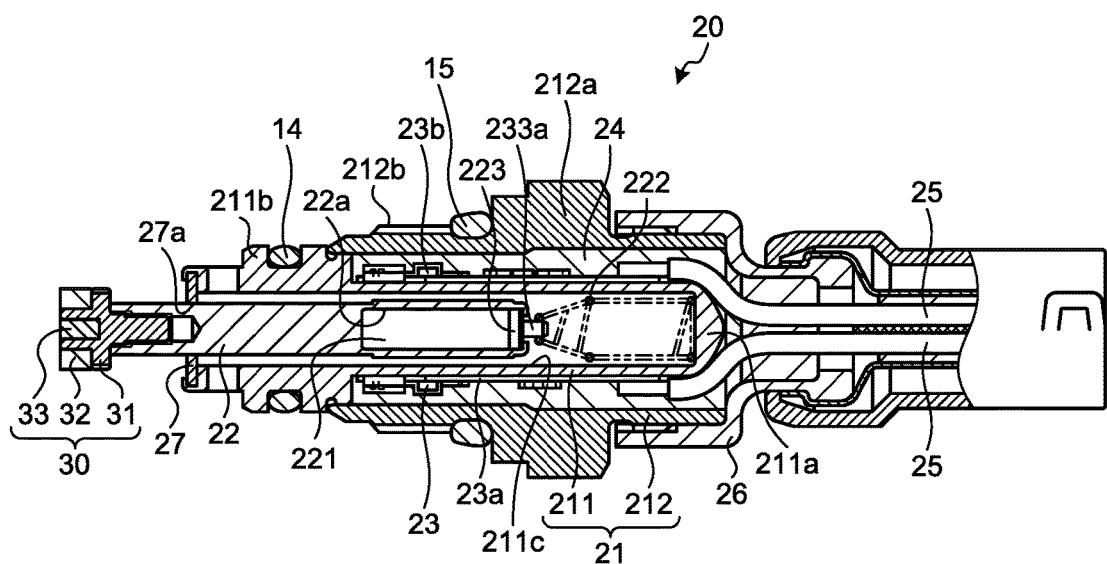
FIG. 1 is a sectional view of a stroke detection device that is an embodiment of the present invention.

Meanwhile, a stroke detection device 20 is arranged in an end portion of the sensor holder 10 on a side isolated from the valve main body 2, in the valve unit 1. The stroke detection device 20 detects a stroke amount of the spool 4 in the longitudinal direction with respect to the valve main body 2, and includes a device main body 21 and a detection rod 22, as illustrated in FIG. 1. The device main body 21 is a portion in which the stroke detection device 20 is attached to the sensor holder 10, and includes an inner cylinder portion 211 and an outer cylinder portion 212. The inner cylinder portion 211 forms a cylindrical shape having one end blocked with a bottom wall 211a and the other end open, and is molded with nonmagnetic material. The inner cylinder portion 211 is provided with a sealing flange 211b in an outer periphery of a base end portion. The outer cylinder portion 212 is a cylindrical member provided to surround an outer periphery of a portion of the inner cylinder portion 211 on one end portion side with respect to the sealing flange 211b. A cover portion flange 212a is provided in a portion that is nearly the center in the longitudinal direction on an outer peripheral surface of the outer cylinder portion 212. Further, a male screw groove 212b is formed in one end portion. The outer cylinder portion 212 has both ends open, and is fixed to the inner cylinder portion 211 in a state where the sealing flange 211b of the inner cylinder portion 211 is attached to one open end portion in which the male screw groove 212b is formed.

A magnetic field detection unit (stroke detection unit) 23 is arranged in a space between the inner cylinder portion 211 and the outer cylinder portion 212. In the magnetic field detection unit 23, a Hall element 23b is mounted on a wiring board 23a, and an output circuit is configured on the wiring board 23a although not clearly illustrated. The Hall element 23b calculates a stroke amount of a magnetic field generation source on the basis of change of strength of a detected magnetic field. The output circuit generates and outputs a detection signal from a calculation result of the Hall element 23b. The magnetic field detection unit 23 is arranged in a state where the wiring board 23a is in contact with an outer peripheral surface of the inner cylinder portion 211 so that the Hall element 23b can detect change of the magnetic field generated inside the inner cylinder portion 211. The space between the inner cylinder portion 211 and the outer cylinder portion 212 is filled with a mold resin 24 without a gap. Note that the reference sign 25 in FIG. 2 is a signal line pulled out to transmit the detection signal output from the output circuit. Further, the reference sign 26 is a coupler provided on the outer cylinder portion 212 to surround a pulled out portion of the signal line 25.

The detection rod 22 is a columnar member having an outer diameter that can be accommodated in a center hole 211c of the inner cylinder portion 211. The detection rod 22 slidably penetrates a guide hole 27a of a guide member 27 provided on an open end portion of the inner cylinder portion 211, and can be moved along the longitudinal direction with respect to the inner cylinder portion 211. The detection rod 22 is provided with a detection magnet 221 in an end portion accommodated in the center hole 211c of the inner cylinder portion 211, and a backup spring 222 between the detection rod 22 and the bottom wall of the inner cylinder portion 211.

The detection magnet 221 is a rod-like permanent magnet. The detection magnet 221 is accommodate in an attaching hole 22a open to a base end surface of the detection rod 22, together with a cover member 223, and then an open end portion of the detection rod 22 is caulked so that the detection magnet 221 is not dropped from the inside of the detection rod 22. The backup spring 222 is a non-linear coil spring having a base end portion wound in a large diameter and a tip end portion wound in a small diameter. The backup spring 222 functions to bias the detection rod 22 to the inner cylinder portion 211 in a protruding direction on a steady basis, by bringing the base end portion in contact with the bottom wall 211a and arranging the tip end portion in an outer peripheral portion of a support pin 223a protruding from the cover member 223. As is clear from the drawing, the backup spring 222 is configured from a wound metal with a small diameter so that the set load becomes sufficiently smaller than that of the return spring 7.

Further, the stroke detection device 20 is provided with an attracting unit 30 in a tip end portion of the detection rod 22. The attracting unit 30 includes a unit holder 31 attached to the tip end portion of the detection rod 22, and an attracting magnet 32 attached to the unit holder 31.

Figure 3:
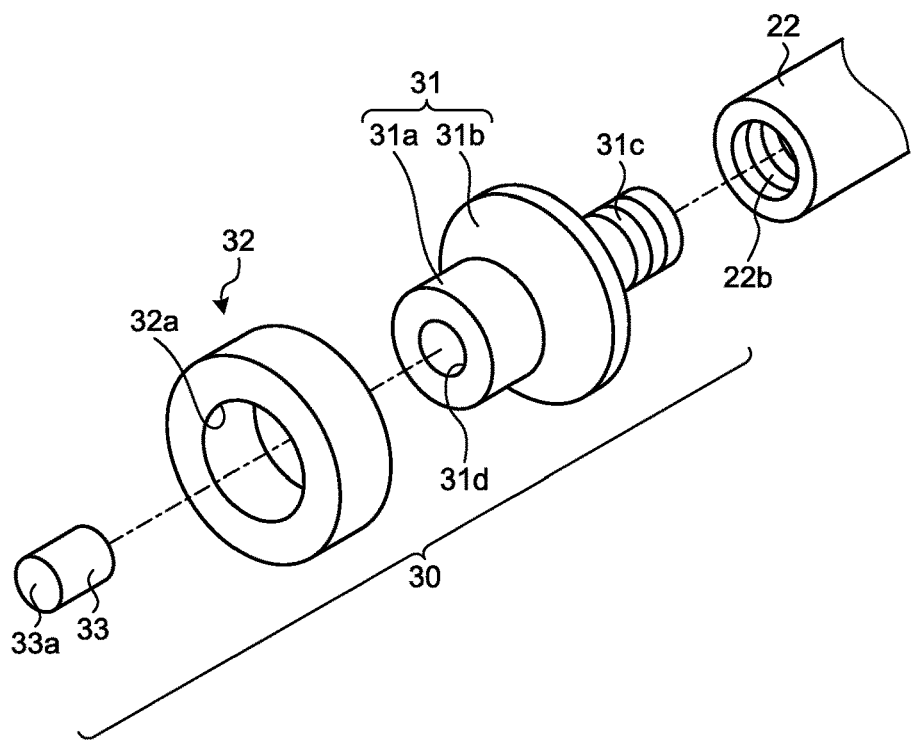
FIG. 3 is an exploded perspective view of an attracting unit to be applied to the stroke detection device illustrated in FIG. 1.
Figure 4:
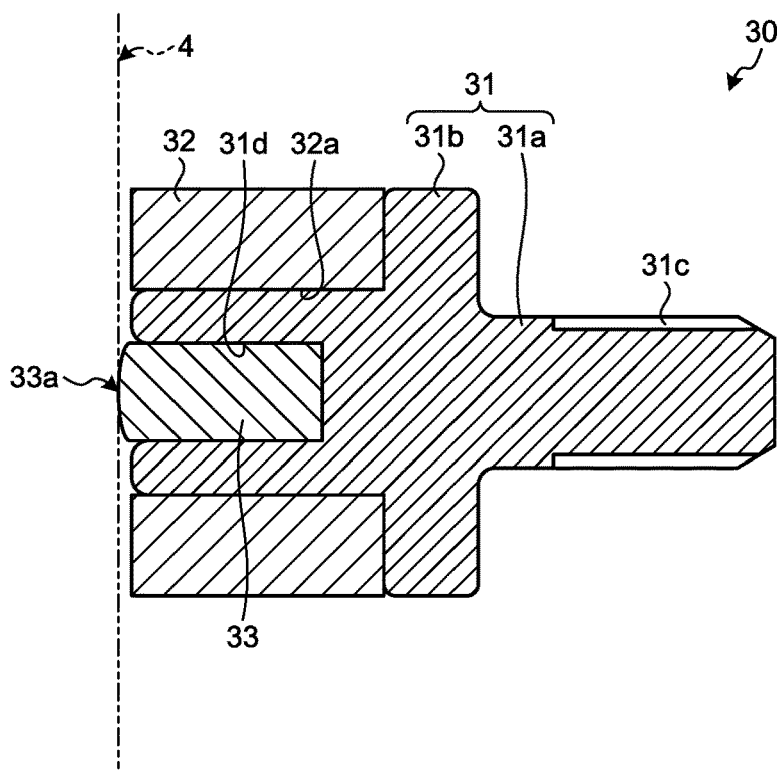
FIG. 4 is an enlarged sectional view of the attracting unit to be applied to the stroke detection device illustrated in FIG. 1.

As illustrated in FIGS. 3 and 4, the unit holder 31 includes a holder base portion 31a forming a columnar shape and a unit flange 31b provided in a portion nearly in the center of the holder base portion 31a in the longitudinal direction, and is integrally molded with magnetic material such as iron. The holder base portion 31a has a smaller diameter than the tip end portion of the detection rod 22, and the unit flange 31b has a larger outer diameter than the detection rod 22. In the holder base portion 31a, a male screw groove 31c is formed in a portion positioned on one end portion side with respect to the unit flange 31b, and an aligning hole 31d is provided in an end surface positioned on the other end side with respect to the unit flange 31b. The male screw groove 212b can be screwed with a female screw hole 22b open to a tip end surface of the detection rod 22. The aligning hole 31d is a hole with a circular cross section, and includes an aligning member 33 therein. The aligning member 33 is a columnar member having one end surface forming a spherical shape, and is molded with nonmagnetic material. The aligning member 33 is fixed to the aligning hole 31d in a state where the end surface forming a spherical shape (hereinafter, referred to as "spherical tip end surface (spherical surface) 33a") protrudes from an end surface of the holder base portion 31a.

The attracting magnet 32 is a permanent magnet forming a cylindrical shape having a center hole 32a into which the holder base portion 31a can be inserted, and is attached to the unit holder 31 in a state where the holder base portion 31a is inserted into the center hole 32a. In the present embodiment, a neodymium magnet is applied as the attracting magnet 32. As is clear from FIG. 4, the attracting magnet 32 is configured such that when one end surface comes in contact with the unit flange 31b, the other end surface is aligned with the end surface of the holder base portion 31a. Therefore, in the attracting unit 30, the spherical tip end surface 33a of the aligning member 33 protrudes most.

The attracting unit 30 can be moved together with the detection rod 22 with respect to the device main body 21 by screwing the male screw groove 31c of the holder base portion 31a with the female screw hole 22b of the detection rod 22.

The stroke detection device 20 configured as described above is attached by being accommodated in a sensor accommodating hole 13 provided in the sensor holder 10, and screwing the male screw groove 212b formed in the outer cylinder portion 212 with a female screw 13a of the sensor accommodating hole 13, as illustrated in FIG. 2. The detection rod 22 is arranged to pass through an insertion hole 11b formed in the inner bottom surface 11a of the sensor holder 10 and protrudes into the spool accommodating hole 11, and is in contact with an end surface 4d of the spool 4 through the tip-end attracting unit 30. Seal members 14 and 15 are respectively interposed between the sealing flange 211b of the inner cylinder portion 211 and the sensor accommodating hole 13, and between the outer cylinder portion 212 and the sensor accommodating hole 13.

When the spool 4 strokes with respect to the valve main body 2 from the state illustrated in FIG. 2, the detection rod 22 in contact with the end surface 4d of the spool 4 is operated together through the attracting unit 30, and the position of the detection rod 22 with respect to the device main body 21 is changed, in the stroke detection device 20. As a result, the position of the detection magnet 221 with respect to the magnetic field detection unit 23 is changed with the movement of the detection rod 22, and the strength of the magnetic field is changed. Therefore, the detection signal according to the stroke amount of the detection rod 22 is output from the output circuit of the magnetic field detection unit 23.

According to the stroke detection device 20, the detection rod 22 is maintained to be in contact with the end surface 4d of the spool 4 by the magnetic force of the attracting magnet 32, and thus large attracting force can be obtained between the detection rod 22 and the spool 4 without affecting an external dimension. Therefore, the detection rod 22 can be kept in contact with the end surface 4d of the spool 4 on the steady basis without increasing the attracting unit 30 and the device main body 21 in size, and the stroke amount of the spool 4 can be accurately detected.

Further, the detection rod 22 is in contact with the end surface 4d of the spool 4 through the spherical tip end surface 33a of the aligning member 33. Therefore, even in a state where the end surface 4d of the spool 4 is inclined with respect to the central axis, the detection rod 22 is moved along the central axis, and detection accuracy is not affected.

Further, the backup spring 222 is provided between the bottom wall of the inner cylinder portion 211 and the detection rod 22, and thus even if the attracting unit 30 is isolated from the end surface 4d of the spool 4, the attracting unit 30 can be brought in contact with the end surface 4d of the spool 4 again by elastic force of the backup spring 222. A set load of the backup spring 222 is a load that can move the attracting unit 30 to the end surface 4d of the spool 4, and thus switching characteristics of the spool 4 are not affected.

Note that in the above-described embodiment, the stroke amount of the detection rod 22 is calculated by detecting the magnetic field of the detection magnet 221 arranged in the detection rod 22. However, the stroke detection unit of the present invention is not limited thereto. For example, the stroke amount of the detection rod 22 with respect to the device main body 21 may be detected by providing a linear potentiometer or a linear encoder between the device main body 21 and the detection rod 22.

Further, in the above-described embodiment, the aligning member molded with nonmagnetic material is applied as the aligning member 33 in contact with the end surface 4d of the spool 4. Therefore, foreign substances such as abrasion powder are free from being attracted to the contact portion of the aligning member 33 with the spool 4. Therefore, abrasion or detection error caused by the attraction of the foreign substances such as abrasion powder is not caused. However, in the present invention, the aligning member 33 may be molded with magnetic material.

Figure 5:
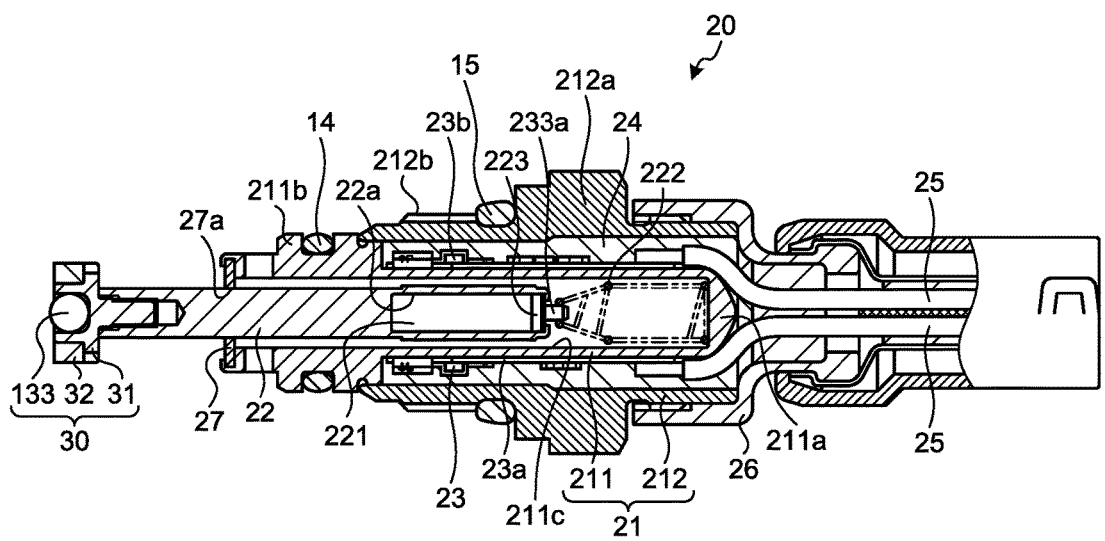
FIG. 5 is a sectional view illustrating a modification of the stroke detection device illustrated in FIG. 1.
Figure 6:
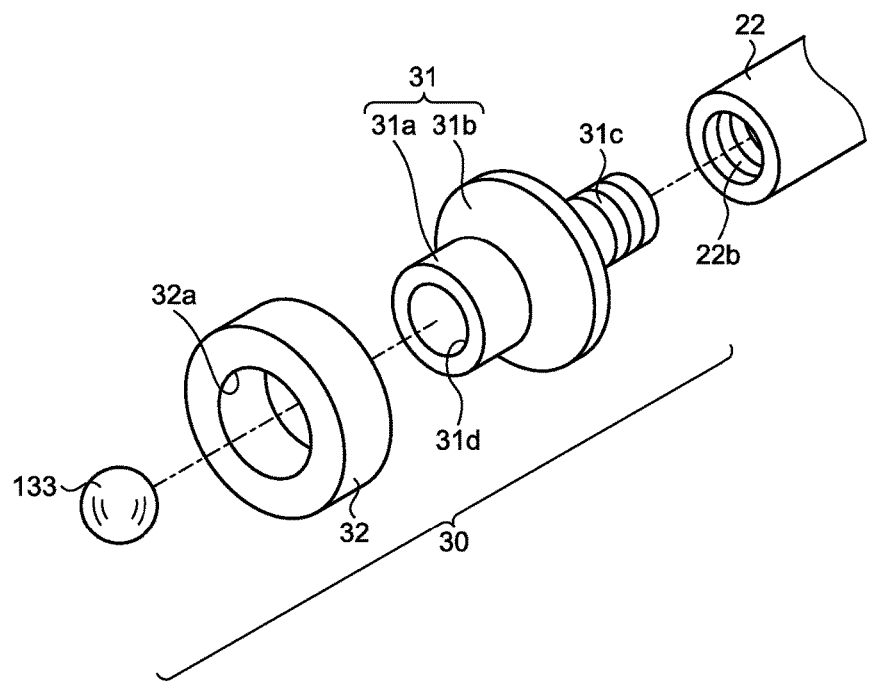
FIG. 6 is an exploded perspective view of an attracting unit to be applied to the stroke detection device illustrated in FIG. 5.

Further, in the above-described embodiment, the aligning member forming the columnar shape having the spherical tip end surface 33a is applied as the aligning member 33 in contact with the end surface 4d of the spool 4. Therefore, a radius of curvature of the spherical tip end surface 33a can be set large without increasing the external dimension, and contact pressure force between the aligning member 33 and the spool 4 can be decreased. However, the aligning member forming the columnar shape is not necessarily applied to the present invention, and even in a case where an aligning member 133 forming a sphere shape is applied to configure an attracting unit 130, like the modifications illustrated in FIGS. 5 and 6, similar functions and effects can be exhibited. Note that, in the modifications illustrated in FIGS. 5 and 6, the configurations similar to those in the embodiment are denoted with the same reference signs. Further, the aligning member 133 forming the spherical shape may be molded with either magnetic material or nonmagnetic material.

REFERENCE SIGNS LIST

2 VALVE MAIN BODY
4 SPOOL
4d END SURFACE OF SPOOL
20 STROKE DETECTION DEVICE
21 DEVICE MAIN BODY
22 DETECTION ROD
23 MAGNETIC FIELD DETECTION UNIT
30 ATTRACTING UNIT
31 UNIT HOLDER
32 ATTRACTING MAGNET
33 ALIGNING MEMBER
33a SPHERICAL TIP END SURFACE
130 ATTRACTING UNIT
133 ALIGNING MEMBER
221 DETECTION MAGNET
222 BACKUP SPRING

The invention claimed is:

1. A stroke detection device for detecting, along a longitudinal direction, a stroke amount of a spool arranged in a valve main body, the stroke detection device comprising:
a device main body attached to the valve main body;
a detection rod extending along the longitudinal direction of the spool, and movably arranged along the longitudinal direction inside the device main body, wherein a tip end portion of the detection rod faces an end surface of the spool;
a stroke detection unit configured to output a detection signal according to the stroke amount of the detection rod with respect to the device main body; and
an attracting unit located at the tip end portion of the detection rod to maintain direct physical contact with the end surface of the spool by magnetic force.

2. The stroke detection device according to claim 1, wherein
the attracting unit includes
an aligning member being in contact with the end surface of the spool through a spherical surface, and
a permanent magnet forming a cylindrical shape and arranged in a portion serving as a periphery of the aligning member.

3. The stroke detection device according to claim 2, wherein the aligning member forms a columnar shape having the spherical surface on a tip end portion.

4. The stroke detection device according to claim 2, wherein the aligning member is molded with nonmagnetic material.

5. The stroke detection device according to claim 1, wherein a backup spring that biases the detection rod toward the spool is interposed between the device main body and the detection rod.

6. A stroke detection device for detecting, along a longitudinal direction, a stroke amount of a spool arranged in a valve main body, the stroke detection device comprising:
a device main body attached to the valve main body;
a detection rod extending along the longitudinal direction of the spool, and movably arranged along the longitudinal direction inside the device main body, wherein a tip end portion of the detection rod faces an end surface of the spool;
a stroke detection unit configured to output a detection signal according to the stroke amount of the detection rod with respect to the device main body; and
an attracting unit, which includes a permanent magnet, located at the tip end portion of the detection rod to maintain direct physical contact with the end surface of the spool by magnetic force.

7. The stroke detection device according to claim 6, wherein
the attracting unit includes
an aligning member being in contact with the end surface of the spool through a spherical surface, and
the permanent magnet forming a cylindrical shape and arranged in a portion serving as a periphery of the aligning member.

8. The stroke detection device according to claim 7, wherein the aligning member forms a columnar shape having the spherical surface on a tip end portion.

9. The stroke detection device according to claim 7, wherein the aligning member is molded with nonmagnetic material.

10. The stroke detection device according to claim 6, wherein a backup spring that biases the detection rod toward the spool is interposed between the device main body and the detection rod.

* * * * *